(12) United States Patent
Adams et al.

(10) Patent No.: US 7,593,993 B2
(45) Date of Patent: Sep. 22, 2009

(54) METHOD AND SYSTEM FOR MESSAGE THREAD COMPRESSION

(75) Inventors: Neil P. Adams, Waterloo (CA); Harry R. Major, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 757 days.

(21) Appl. No.: 11/050,869

(22) Filed: Feb. 7, 2005

(65) Prior Publication Data
US 2006/0178134 A1 Aug. 10, 2006

(51) Int. Cl.
G06F 15/16 (2006.01)
G06F 12/00 (2006.01)

(52) U.S. Cl. ...... 709/206; 709/207

(58) Field of Classification Search .......... 709/206, 709/207
See application file for complete search history.

(56) References Cited

U.S. PATENT DOCUMENTS

| | | | |
|---|---|---|---|
| 6,615,241 B1 | 9/2003 | Miller et al. | |
| 6,785,712 B1* | 8/2004 | Hogan et al. | 709/206 |
| 7,003,724 B2* | 2/2006 | Newman | 714/273 |
| 2002/0104026 A1* | 8/2002 | Barra et al. | 713/202 |
| 2002/0116458 A1* | 8/2002 | Bricklin et al. | 709/204 |
| 2004/0044735 A1 | 3/2004 | Hoblit | |
| 2004/0172453 A1* | 9/2004 | De Mendonca et al. | 709/206 |
| 2004/0221295 A1 | 11/2004 | Kawai et al. | |
| 2006/0031574 A1* | 2/2006 | Simelius | 709/238 |

FOREIGN PATENT DOCUMENTS

WO   WO 2004/072872 A1   8/2004

OTHER PUBLICATIONS

European Search Report For EP05100850.6, mailed Jul. 15, 2005.

* cited by examiner

Primary Examiner—Zarni Maung
(74) Attorney, Agent, or Firm—Ogilvy Renault LLP

(57) ABSTRACT

A method for compressing electronic mail messages each having a message thread for storage in a storage device, comprising: identifying one or more sections of each message thread; assigning a respective identifier to each section; storing one occurrence of each section in the storage device for retrieval using its identifier; replacing each section in each thread by its identifier to thereby compress the messages; and, storing the messages in the storage device.

21 Claims, 7 Drawing Sheets

500

| Unique Identifier | Message Section |
|---|---|
| 001 | Would you like to go to lunch today? |
| 002 | Sure, what time?<br><br>-----Original Message-----<br>From: Neil Adams<br>Sent: November 25, 2003 10:28 AM<br>To: Harry Major<br>Subject: Lunch? |
| 003 | How about 12:15?<br><br>-----Original Message-----<br>From: Harry Major<br>Sent: November 25, 2003 10:29 AM<br>To: Neil Adams<br>Subject: Re: Lunch? |

FIG. 5

METHOD AND SYSTEM FOR MESSAGE THREAD COMPRESSION

FIELD OF THE INVENTION

This invention relates to the field of electronic mail ("email") messages, and more specifically, to compressing message threads for email messages in wireless and other devices.

BACKGROUND

Current wireless mobile communication devices include microprocessors, memory, soundcards, and run one or more software applications. Examples of software applications used in these wireless devices include micro-browsers, address books, email clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

On a constrained device such as a wireless device, memory is often in short supply. The number of email messages that a wireless device can store is sometimes used as a selling feature of the device. The new features and applications that are being introduced for wireless devices take up more memory space and hence reduce the number of email messages that a user can store. Users find it annoying to have messages erased from their device because there is a lack of memory space.

One method of saving memory space is to use compression techniques to compress the email message bodies. On average, this can double the number of messages that the wireless device can hold. However, a typical message list for a user has many threads of messages. A message thread is a sequence of messages relating to the same topic. A simple message thread includes messages that switch back and forth between two recipients much like a conversation. Typically, each message in the thread contains the message text from the body of the message that the user is replying to. The longer the thread goes on, the longer the original text of the message is, and the more memory space each reply uses. The same text appears multiple times over the message thread, but since the text appears in different messages, current compression algorithms are not able to take advantage of the redundancy between the messages.

Therefore, one shortcoming of present wireless devices and wireless communications systems is their inability to efficiently store email message threads. This is especially so as the capabilities of different wireless devices vary and the amount of resources (e.g., flash memory, remaining carrier-enforced data limits, etc.) available is limited and constantly changing due to the arrival of new messages, calendar appointments, etc. Moreover, the need to efficiently store email message threads is increasing in importance with the increase in the number of applications being run on wireless devices.

A need therefore exists for an improved method and system of storing email message threads in wireless and other devices. Accordingly, a solution that addresses, at least in part, the above and other shortcomings is desired.

SUMMARY

According to one aspect of the invention, there is provided a method for compressing electronic mail messages each having a message thread for storage in a storage device, comprising: identifying one or more sections of each message thread; assigning a respective identifier to each section; storing one occurrence of each section in the storage device for retrieval using its identifier; replacing each section in each thread by its identifier to thereby compress the messages; and, storing the messages in the storage device.

Preferably, the method further includes deleting at least some identifiers and sections relating to a message when the message is deleted from the storage device.

Preferably, at least some of the message threads have at least one of the sections in common.

Preferably, the sections are message text sections.

Preferably, the step of assigning further includes hashing each section to define its respective identifier.

Preferably, the message text sections are sequential.

Preferably, the message text sections contain one of original message text and subsequent reply message text.

Preferably, each message text section contains one of message text generated by a wireless device and message text received by the wireless device.

Preferably, the storage device is contained in a wireless device.

In accordance with further aspects of the present invention there is provided an apparatus such as a data processing system, a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which:

FIG. 5 is a chart illustrating the content of a message section store corresponding to the message exchange of FIG. 4 in accordance with an embodiment of the invention;

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

Figure 1:
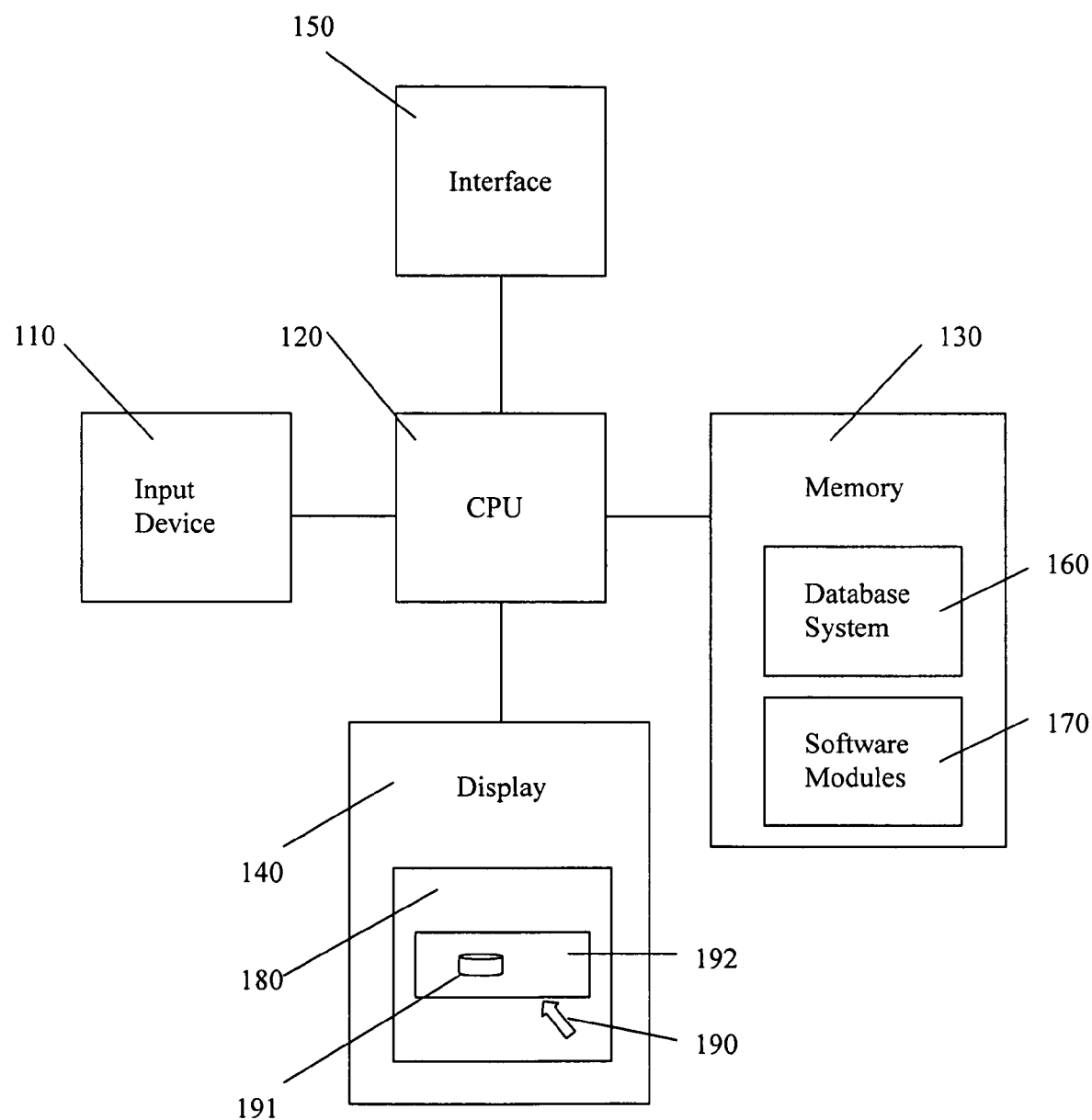
FIG. 1 is a block diagram illustrating a data processing system adapted for implementing an embodiment of the invention.

FIG. 1 is a block diagram illustrating a data processing system 100 adapted for implementing an embodiment of the invention. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (not shown) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present invention. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
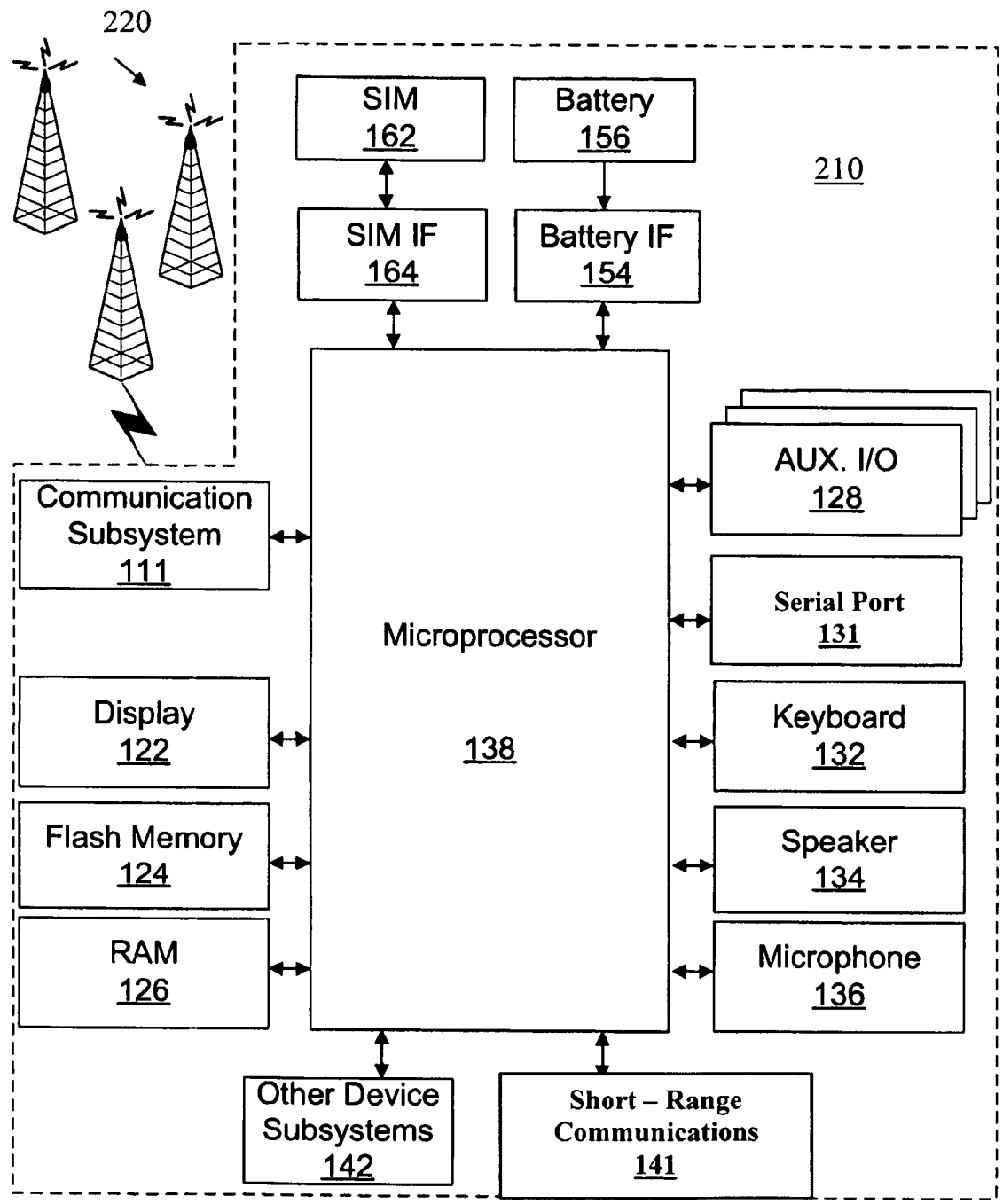
FIG. 2 is a block diagram illustrating an exemplary wireless device and wireless communications system adapted in accordance with an embodiment of the invention.

FIG. 2 is a block diagram illustrating an exemplary wireless device 210 and wireless network 220 adapted in accordance with an embodiment of the invention. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (not shown) and to a wide area network (not shown) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, or a data communication device (with or without telephony capabilities). The device 210 may communicate with any one of a plurality of fixed transceiver stations 220 within its geographic coverage area.

The wireless device 210 will normally incorporate a communication subsystem 111, which includes a RF receiver, a RF transmitter, and associated components, such as one or more (preferably embedded or internal) antenna elements and, local oscillators ("LOs"), and a processing module such as a digital signal processor ("DSP") (all not shown) As will be apparent to those skilled in field of communications, particular design of the communication subsystem 111 depends on the communication network 220 in which the device 210 is intended to operate.

Network access is associated with a subscriber or user of the device 210 and therefore the device 210 requires a Subscriber Identity Module (or "SIM" card) 162 to be inserted in a SIM interface ("IF") 164 in order to operate in the network. The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power (V+) to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132 and display 122, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the mobile station user's corresponding data items stored and/or associated with a host computer system such as the data processing system 100 thereby creating a mirrored host computer on the device 210 with respect to such items. This is especially advantageous where the host computer system 100 is the mobile station user's office computer system. Additional applications may also be loaded onto the device 210 through the network 220, an auxiliary I/O subsystem 128, serial port 131, short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122 and possibly the auxiliary I/O device 128. The keyboard 132 is preferably a complete alphanumeric keyboard and/or telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. Bluetooth™ is a registered trademark of Bluetooth SIG, Inc.

Figure 3:
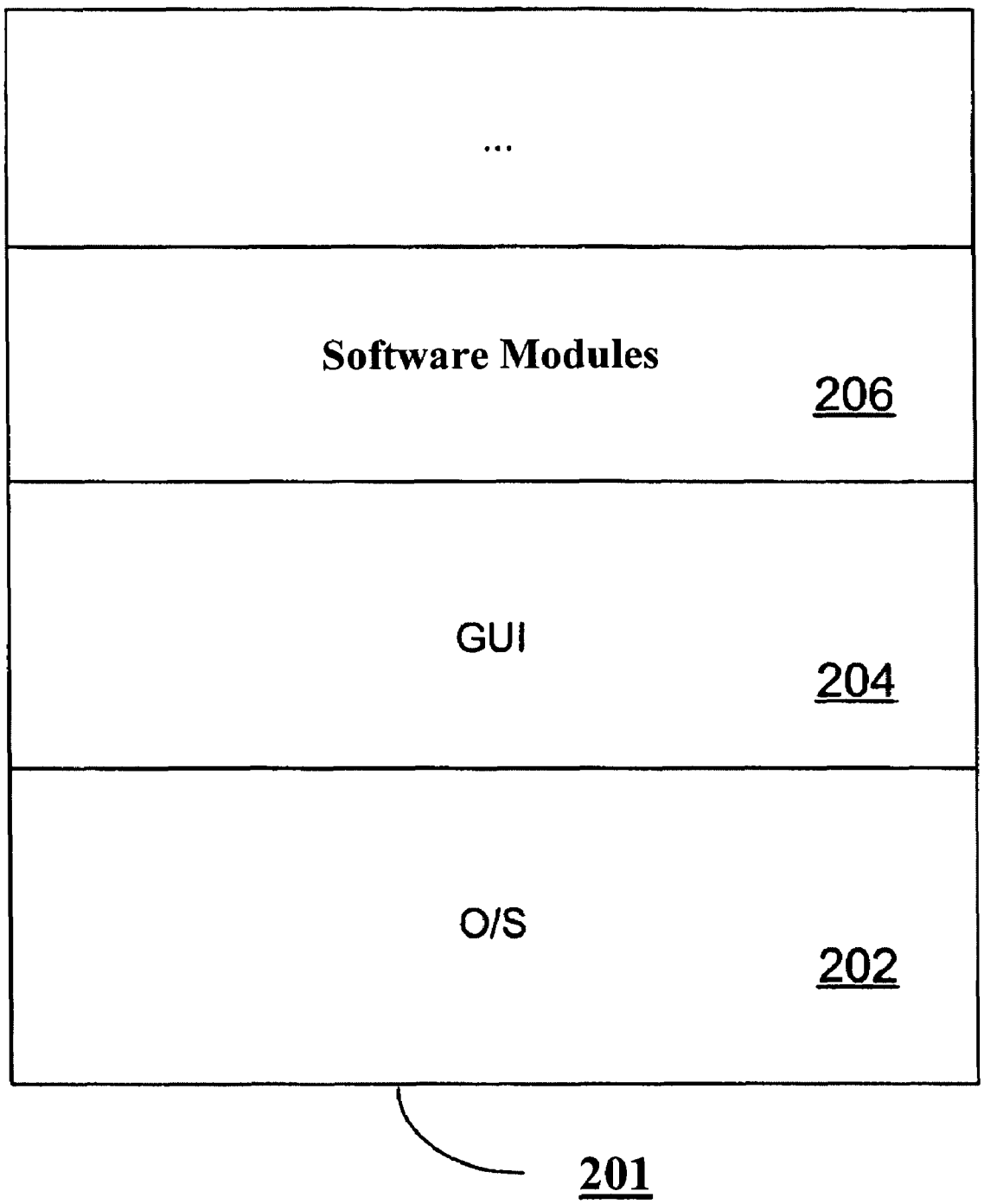
FIG. 3 is a block diagram illustrating a memory of the wireless device of FIG. 2 in accordance with an embodiment of the invention.

FIG. 3 is a block diagram illustrating a memory 201 of the wireless device 210 of FIG. 2 in accordance with an embodiment of the invention. The memory 201 has various software components for controlling the device 210 and may include flash memory 124, RAM 126, or ROM (not shown), for example. In accordance with an embodiment of the invention, the wireless device 210 is intended to be a multi-tasking wireless communications device configured for sending and receiving data items and for making and receiving voice calls.

To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 108, keyboard 132, and the like, and for facilitating output to the user. In accordance with an embodiment of the invention, there are provided software modules 206 for compressing message threads as will be described below. Though not shown, one or more applications for managing communications or for providing personal digital assistant like functions may also be included.

Thus, the wireless device 210 includes computer executable programmed instructions for directing the device 210 to implement the embodiments of the present invention. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

In general, the wireless device 210 has software modules 206 for compressing email message threads. According to the present invention, email message threads are compressed by storing only one copy of each response in the message thread.

Figure 4:
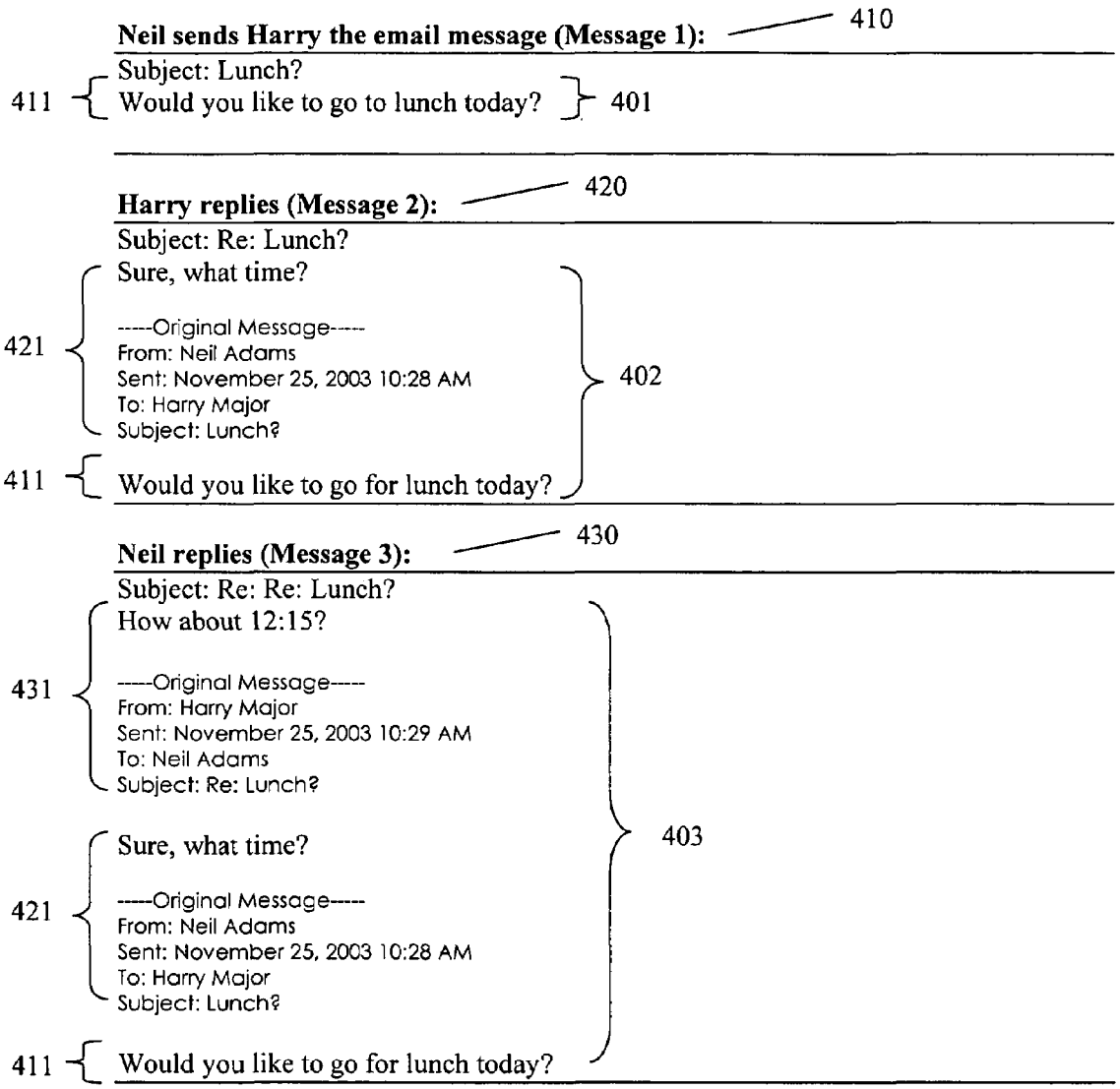
FIG. 4 is a chart illustrating the content of an exemplary email message exchange in accordance with an embodiment of the invention.

FIG. 4 is a chart illustrating the content of an exemplary email message exchange 400 in accordance with an embodiment of the invention. A first user Neil sends a first email message 410 containing message text 411 to a second user Harry. In response, Harry sends a responding second email message 420 containing message text 421 to Neil. The second email message 420 includes the text 411 of the first email message 410. Similarly, Neil may send a third email message 430 containing message text 431 in response to Harry's message 420. The third email message 430 includes the text 411, 421 of first and second messages 410, 420. Thus, for example, the third message 430 contains duplicated information 411, 421 which wastes memory space in each of the users' wireless devices. The linked message text in an email message may be referred to as a message thread 401, 402, 403. In the third message 430, for example, the message thread 403 includes message text 411, 421, 431 from the first, second, and third messages 410, 420, 430.

In accordance with an embodiment of the invention, to save memory space in each wireless device, sections of text from the messages (each of which will be referred to as a "message section" in the following) are extracted. Each messages section is then assigned a unique identifier ("UID"). The UID may be a hash of the message section. The result is then stored in a hash table which will be referred to as a message section store ("MSS") in the following. The MSS thus maps UIDs to message sections. The message sections may be individually compressed within the MSS and are quickly assessable given the UID.

FIG. 5 is a chart illustrating the content of a message section store 500 corresponding to the message exchange 400 of FIG. 4 in accordance with an embodiment of the invention. Given the exemplary message exchange 400 of FIG. 4, when message thread compression is turned on for a wireless device 210, the wireless device 210 stores a MSS 500 containing the information shown in FIG. 5. The MSS 500 includes message sections 511, 521, 531 corresponding to message text 411, 421, 431 extracted from a message thread 401, 402, 403. Each message section 511, 521, 531 is assigned a UID 510, 520, 530.

Figure 6:
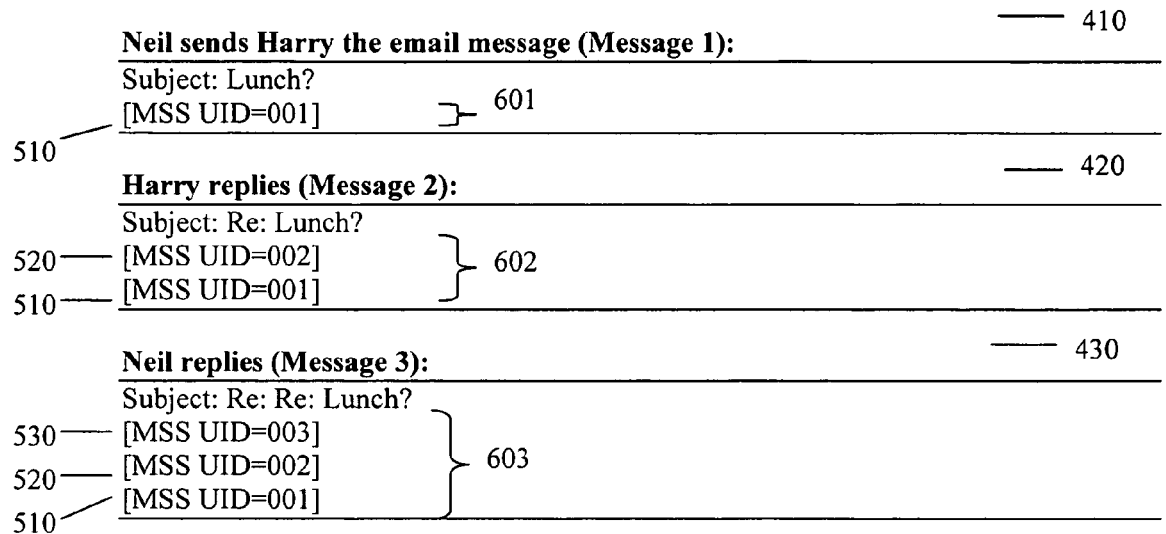
FIG. 6 is a chart illustrating the content of an exemplary email message exchange having messages with compressed message threads in accordance with an embodiment of the invention; and, FIG. 7 is a flow chart illustrating operations of modules for compressing electronic mail messages each having a message thread for storage in a storage device in accordance with an embodiment of the invention.

FIG. 6 is a chart illustrating the content of an exemplary email message exchange 600 having messages 410, 420, 430 with compressed message threads 601, 602, 603 in accordance with an embodiment of the invention. The email message exchange 600 of FIG. 6 contains the three messages 410, 420, 430 of the original message exchange 400 of FIG. 4 but the content of each message 411, 421, 431 has been replaced with corresponding UIDs 510, 520, 530 in each compressed message thread 601, 602, 603. Using the method of the present invention, only one copy of the message text 411, 421, 431 need be stored on the wireless device 210. In the simple example of FIGS. 4 through 6, the compression method of the present invention saved approximately 192 bytes of memory space.

According to an embodiment of the present invention, a parsing method is used when a message 410, 420, 430 is received (or is sent). This parsing method may be described, with reference to FIGS. 4, 5, and 6, as follows.

First, starting from the first character of message text, scan to the beginning of the body of the last reply, or the end of the message. For the third message 430, for example, start from the letter "H" of the word "How" of the message text 431 and scan to the question mark "?" following the expression "Subject: Re: Lunch".

Second, hash the scanned data.

Third, use the hash to look up a UID in the MSS 500.

Fourth, if the UID is found, replace the corresponding message section 531 in the message 430 with the MSS UID 530. If the UID is not found, add the UID and the corresponding message section to the MSS 500 and replace the message section with the UID.

Fifth, if the end of the message has not yet been reached, then start with the next character of message text and scan to the beginning of the body of the next reply text or the end of the message. For the third message 430, for example, start with the letter "S" of the word "Sure" of the message text 421 and scan to the question mark "?" following the expression "Subject: Lunch". As above, hash the scanned data and use the hash to look up a UID in the MSS 500. If the UID is found, replace the corresponding message section 521 in the message 430 with the MSS UID 520. If the UID is not found, add the UID and the corresponding message section to the MSS 500 and replace the message section with the UID.

Sixth, continue the above method for remaining message text in the message. For the third message 430, for example, start with the letter "W" of the word "Would" and scan to the end of the message text 411, that is, to the question mark "?" following the word "today". Then continue as in the firth step above.

In operation, when a user opens a message 410, 420, 430 in the message exchange 600, software modules 206 within the wireless device 210 perform operations to search for MMS UIDs 510, 520, 530 within the message 410, 420, 430 and to replace the MMS UIDs 510, 520, 530 found with corresponding message text 411, 421, 431 from the MMS 500. The message 410, 420, 430 can then be displayed to the user on the display 122 of the wireless device 210.

In addition, a method for clearing the MSS 500 when messages 410, 420, 430 are erased is also provided. A software module 206 is run when a message 410, 420, 430 is deleted (or periodically) which verifies that the message sections 511, 521, 531 in the MSS 500 are used by at least one message 410, 420, 430. Alternatively, a reference count may be created for the entries in the MSS 500. When a message 410, 420, 430 is deleted the MSS reference counts are updated by looking up each of the UIDs 510, 520, 530 in the table 500 and decrementing each entry by one. If the entry decreases to zero, then the entry is removed. This scheme will update the MSS table 500 for each message deleted in O(1) time.

Figure 7:
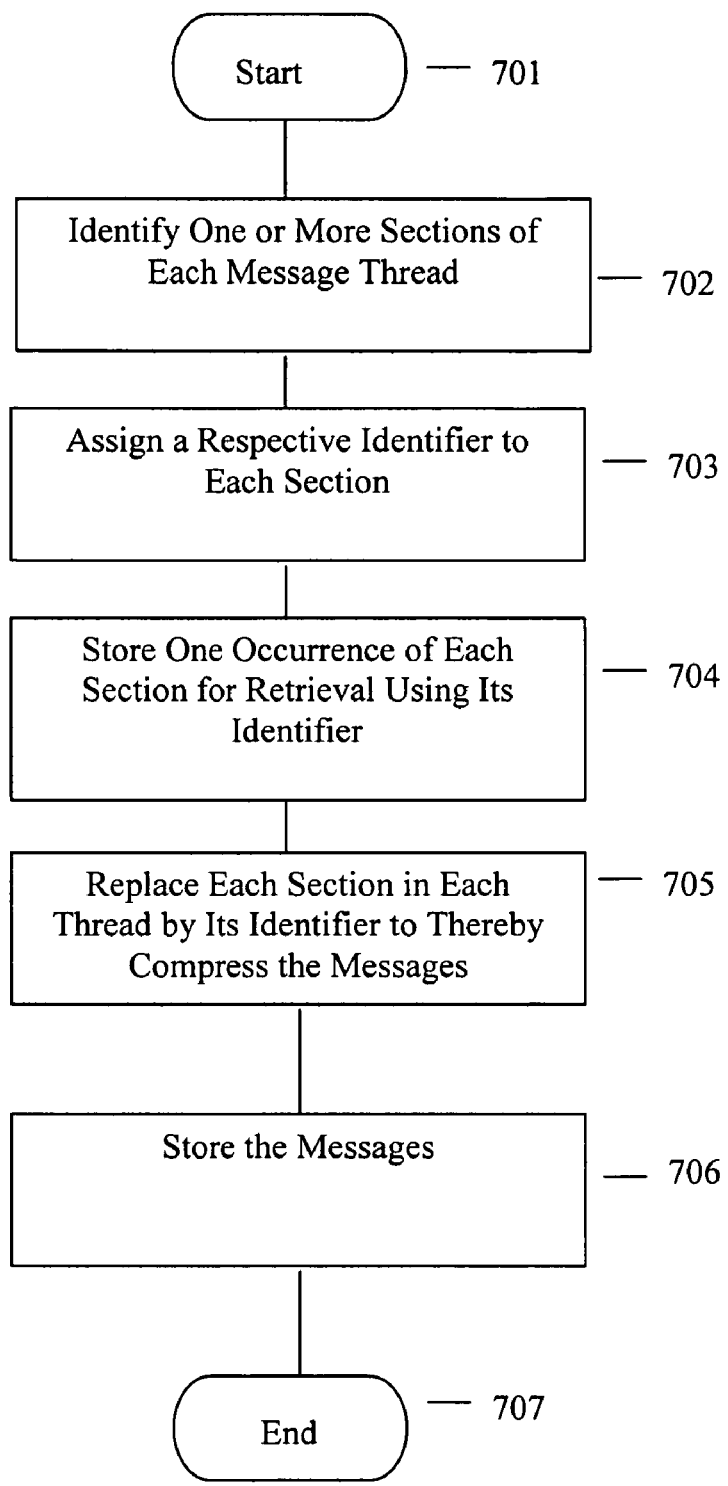

The above described method may be summarized with the aid of a flowchart. FIG. 7 is a flow chart illustrating operations 700 of modules 206 for compressing electronic mail messages 410, 420, 430 each having a message thread 401, 402, 403 for storage in a storage device 201 in accordance with an embodiment of the invention.

At step 701, the operations 700 start.

At step 702, one or more sections 511, 521, 531 of each message thread 403 are identified. Preferably, the sections 511, 521, 531 are message text sections 411, 421, 431. Preferably, the message text sections 411, 421, 431 contain one of original message text and subsequent reply message text. Preferably, each message text section 411, 421, 431 contains one of message text generated by a wireless device 210 and message text received by the wireless device 210. Preferably, the message text sections 411, 421, 431 are sequential.

At step 703, a respective identifier 510, 520, 530 is assigned to each section 511, 521, 531. Preferably, the step of assigning 703 further includes hashing each section 511, 521, 531 to define its respective identifier 510, 520, 530.

At step 704, one occurrence of each section 511, 521, 531 is stored in the storage device 201 for retrieval using its identifier 510, 520, 530.

At step 705, each section 511, 521, 531 in each thread 401, 402, 403 is replaced 601, 602, 603 by its identifier 510, 520, 530 to thereby compress the messages 410, 420, 430.

At step 706, the messages 410, 420, 430 are stored in the storage device 201. Preferably, the method further includes deleting at least some identifiers 510, 520, 530 and sections 511, 521, 531 relating to a message 430 when the message 430 is deleted from the storage device 201. Preferably, at least some of the message threads 401, 402, 403 have at least one of the sections 511, 521, 531 in common. Preferably, the storage device 201 is contained in a wireless device 210.

At step 707, the operations 700 end.

The above described method for compressing message threads is generally performed by the wireless device 210. However, according to an alternate embodiment of the invention, the method can be performed by the data processing system 100.

While this invention is primarily discussed as a method, a person of ordinary skill in the art will understand that the apparatus discussed above with reference to a wireless device 210 and a data processing system 100, may be programmed to enable the practice of the method of the invention. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

What is claimed is:

1. A method for compressing electronic mail messages each having a message thread for storage in a storage device of a wireless device, the message thread having a plurality of electronic mail messages having message text sections and containing duplicate information in the form of duplicate message text sections, the method performed by a processor of the wireless device and comprising:

identifying one or more unique message text sections of each electronic mail message in the message thread;

assigning a unique respective identifier to each unique message text section;

storing one occurrence of each unique message text section in the storage device for retrieval using its unique identifier;

replacing each message text section in each of the plurality of the electronic mail messages of the thread by its identifier to thereby compress the messages by replacing the message text sections including the duplicate message text sections with the respective identifiers; and, storing the messages in the storage device.

2. The method of claim 1 and further comprising deleting at least some identifiers and sections relating to a message when the message is deleted from the storage device.

3. The method of claim 1 wherein at least some of the message threads have at least one of the sections in common.

4. The method of claim 1 wherein the assigning further comprises hashing each section to define its respective identifier.

5. The method of claim 1 wherein the message text sections are sequential.

6. The method of claim 5 wherein the message text sections contain one of original message text and subsequent reply message text.

7. The method of claim 1 wherein each message text section contains one of message text generated by a wireless device and message text received by the wireless device.

8. A system for compressing electronic mail messages each having a message thread for storage in a storage device of a wireless device, the message thread having a plurality of electronic mail messages having message text sections and containing duplicate information in the form of duplicate message text sections, the system comprising:

a processor coupled to the storage device and to an interface to a network and adapted for:

identifying one or more unique message text sections of each electronic mail message in the message thread;

assigning a unique respective identifier to each unique message text section;

storing one occurrence of each unique message text section in the storage device for retrieval using its unique identifier;

replacing each message text section in each of the plurality of the electronic mail messages of the thread by its identifier to thereby compress the messages by replacing the message text sections including the duplicate message text sections with the respective identifiers; and, storing the messages in the storage device.

9. The system of claim 8 wherein the processor is further adapted for deleting at least some identifiers and sections relating to a message when the message is deleted from the memory.

10. The system of claim 8 wherein at least some of the message threads have at least one of the sections in common.

11. The system of claim 8 wherein the processor is further adapted for hashing each section to define its respective identifier.

12. The system of claim 8 wherein the message text sections are sequential.

13. The system of claim 12 wherein the message text sections contain one of original message text and subsequent reply message text.

14. The system of claim 8 wherein each message text section contains one of message text generated by a wireless device and message text received by the wireless device.

15. A computer program product having a computer readable medium tangibly embodying computer executable code for directing a data processing system to compress electronic mail messages each having a message thread for storage in a storage device of a wireless device, the message thread having a plurality of electronic mail messages having message text sections and containing duplicate information in the form of duplicate message text sections, the method performed by a processor of the wireless device and, the computer program product comprising:

code for identifying one or more unique message text sections of each electronic mail message in the message thread;

code for assigning a unique respective identifier to each unique message text section;

code for storing one occurrence of each unique message text section in the storage device for retrieval using its unique identifier;

code for replacing each message text section in each of the plurality of the electronic mail messages of the thread by its identifier to thereby compress the messages by replacing the message text sections including the duplicate message text sections with the respective identifiers; and, code for storing the messages in the storage device.

16. The computer program product of claim 15 and further comprising code for deleting at least some identifiers and sections relating to a message when the message is deleted from the storage device.

17. The computer program product of claim 15 wherein at least some of the message threads have at least one of the sections in common.

18. The computer program product of claim 15 wherein the code for assigning further comprises code for hashing each section to define its respective identifier.

19. The computer program product of claim 15 wherein the message text sections are sequential.

20. The computer program product of claim 19 wherein the message text sections contain one of original message text and subsequent reply message text.

21. The computer program product of claim 15 wherein each message text section contains one of message text generated by a wireless device and message text received by the wireless device.

* * * * *

UNITED STATES PATENT AND TRADEMARK OFFICE
CERTIFICATE OF CORRECTION

PATENT NO. : 7,593,993 B2
APPLICATION NO. : 11/050869
DATED : September 22, 2009
INVENTOR(S) : Adams et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this

Twenty-eighth Day of September, 2010

David J. Kappos
*Director of the United States Patent and Trademark Office*